United States Patent
Bandel (10) Patent No.: US 9,585,210 B2
(45) Date of Patent: Feb. 28, 2017

(54) REDUCED FLICKER DRIVER CIRCUIT FOR LED SYSTEMS

(71) Applicant: Hubbell Incorporated, Shelton, CT (US)

(72) Inventor: Michael Bandel, North Aurora, IL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/700,927

(22) Filed: Apr. 30, 2015

(65) Prior Publication Data
US 2016/0323945 A1  Nov. 3, 2016

(51) Int. Cl.
H05B 33/08 (2006.01)
H02M 3/156 (2006.01)

(52) U.S. Cl.
CPC ........ H05B 33/0815 (2013.01); H02M 3/156 (2013.01); H05B 33/0845 (2013.01)

(58) Field of Classification Search
CPC .................................................. H02M 3/156
See application file for complete search history.

(56) References Cited

U.S. PATENT DOCUMENTS

| | | |
|---|---|---|
| 4,754,385 A | 6/1988 | McDade et al. |
| 5,786,990 A | 7/1998 | Marrero |
| 2011/0317454 A1* | 12/2011 | Lin ............... H02M 3/3353 363/21.13 |
| 2012/0176060 A1* | 7/2012 | Luccato ............ H02M 3/335 315/291 |
| 2013/0235623 A1* | 9/2013 | Huang ............. H02M 3/156 363/21.17 |
| 2013/0300310 A1 | 11/2013 | Hu |
| 2015/0171755 A1* | 6/2015 | Stoeger ........... H02M 3/3376 307/43 |

OTHER PUBLICATIONS

Patel et al., Design Review: 150 Watt Current-Mode Flyback, 2001, Texas Instruments, Fig. 1, pp. 6.1-6.15.*
Brown, "Flicker and dimmer challenges in LED-lamp design," www.powersystemdesign.com, May 19, 2012—3 pages.
IWatt Reference Design EBC980, "0-10V or Wireless Dimmable LED Driver with iW3630 (AC input 100-277V AC, Output 30-55V 700mA)," 2013—12 pages.
(Continued)

*Primary Examiner* — Douglas W Owens
*Assistant Examiner* — Pedro C Fernandez
(74) *Attorney, Agent, or Firm* — Dority & Manning, P.A.

(57) ABSTRACT

LED systems and circuits for generating a driver output for powering one or more LED devices are provided. A dimmable driver circuit can include a controller configured to reduce output ripple current to reduce flicker over the dimming range of the LED system. The dimmable driver circuit can receive a dimming control signal (e.g. a 0V to 10V dimming control signal) over an isolated dimming interface to reduce leakage current at the dimming interface. In addition, a dual-switch flyback converter circuit can be employed to increase efficiency of the driver circuit as well as to reduce electromagnetic interference (EMI) with the LED devices, such as EMI resulting from differential mode noise.

18 Claims, 6 Drawing Sheets

(56) References Cited

OTHER PUBLICATIONS

IW3630 Product Brief, "AC/DC Digital Power Controller for High Power Factor Analog and 0-10V Dimmable LED Drivers," 2013—7 pages.
Patel et al., "150 Watt Flyback Regulator," 2001, pp. 6-1-6-15.
PCT International Search Report for corresponding PCT Application No. PCT/US2016/029952, mailed on Jul. 29, 2016—5 pages.

\* cited by examiner

REDUCED FLICKER DRIVER CIRCUIT FOR LED SYSTEMS

FIELD

The present disclosure relates generally to driver circuits, and more particularly to driver circuits for use in, for instance, LED lighting systems.

BACKGROUND

LED lighting systems can include one or more LED devices that become illuminated as a result of the movement of electrons through a semiconductor material. LED devices are becoming increasingly used in many lighting applications and have been integrated into a variety of products, such as light fixtures, indicator lights, flashlights, and other products. LED lighting systems can provide increased energy efficiency, life and durability, can produce less heat, and can provide other advantages relative to traditional incandescent and fluorescent lighting systems. Moreover, the efficiency of LED lighting systems has increased such that higher power can be provided at lower cost to the consumer.

LED lighting systems typically include a driver circuit that can be configured to convert an input AC or DC power into a suitable driver output (e.g. driver current) for powering one or more LED devices. Driver circuits can include one or more control devices that control switching elements (e.g. transistors) to provide a desired driver output. Driver circuits can provide for dimming control of the LED devices, as well as for other functions, such as flicker reduction, power factor correction, and reduced electromagnetic interference.

SUMMARY

Aspects and advantages of embodiments of the present disclosure will be set forth in part in the following description, or may be learned from the description, or may be learned through practice of the embodiments.

One example aspect of the present disclosure is directed to a driver circuit for providing a driver output to one or more light emitting diode (LED) devices. The driver circuit comprises an input configured to receive an input power signal and a converter circuit configured to convert the input power signal to an adjusted power signal. The driver circuit further includes a dual-switch flyback converter circuit. The dual-switch flyback converter circuit is configured to convert the adjusted power signal to a driver output. The driver circuit further includes a controller configured to generate a flyback drive signal for switching the first switching element and the second switching element of the dual-switch flyback converter circuit. The controller is configured to control the converter circuit to reduce low frequency AC components in the adjusted power signal so that low frequency ripple in the driver output is reduced.

Another example aspect of the present disclosure is directed to a light emitting diode (LED) system. The system can include one or more LED devices and a converter circuit. The converter circuit can include a rectifier and a power switching element. The rectifier can be configured to convert an AC input power into an AC rectified input signal. The converter circuit can be configured to convert the AC rectified input signal to an adjusted power signal. The LED system can further include a dual-switch flyback converter circuit configured to receive the adjusted power signal and to convert the adjusted power signal to a driver output. The dual-switch flyback converter includes an input transformer, an output transformer, a first switching element and a second switching element. The LED system further includes a dimming circuit configured to receive a dimming control signal. The LED system further includes a controller configured to generate a flyback drive signal for switching the first switching element and the second switching element of the dual-switch flyback converter circuit based at least in part on the dimming control signal. The controller configured to reduce low frequency AC components in the adjusted power signal.

Yet another example aspect of the present disclosure is directed to a light emitting diode (LED) unit. The LED unit includes one or more LED devices and a converter circuit having a power switching element. The converter circuit is configured to convert an input power signal to an adjusted power signal. The LED unit further includes a dual-switch flyback converter circuit configured to receive the adjusted power signal and to convert the adjusted power signal to a driver output. The dual-switch flyback converter includes a first switching element and a second switching element. The LED unit further includes means for reducing a ripple current of the driver output so as to reduce flicker in the one or more LED devices.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a reduced flicker driver for use in, for instance, LED lighting systems. A lighting system can include, but is not limited to, one or more of a lighting circuit, light engine, one or more luminaires, one or more light fixtures, one or more lighting units, a plurality of lighting devices arranged in an environment, or combinations thereof. LED lighting systems can include one or more LED devices.

LED lighting systems can include a driver circuit that is configured to convert an input AC or DC power into a suitable driver output (e.g. driver current) for driving one or more LED devices. Dimmable driver circuits can be used to vary the driver output used to power one or more LED devices to control the output (e.g. radiant flux) of the LED devices. Dimmable driver circuits can include, for instance, one or more switching elements (e.g. transistors) that are switched using pulse-width modulation (PWM) techniques to provide a desired driver output. Certain dimmable driver circuits can be configured to receive a dimming control signal (e.g. a 0V to 10V lighting control signal) via a dimming interface for controlling the output of the driver current.

Flicker in the LED devices can occur as a result of cyclic variations in the driver output during operation of the LED devices. For instance cyclic variation in the driver output associated with lower frequencies (e.g. 200 Hz or less) can result in visible or non-visible flicker. Flicker can be undesirable if noticeable to consumers. In certain cases, flicker can be more perceptible in LED devices as a result of the faster response time of LED devices relative to other light sources. For instance, LED devices may be more susceptible to flicker caused by small fluctuations resulting from noise (e.g. from electromagnetic inference or radio frequency interference) associated with power sources. In some cases, flicker can be noticeable at lower dimming levels, particularly in LED lighting systems using PWM-based dimming driver circuits.

According to example aspects of the present disclosure, a dimmable driver circuit can include a controller configured to reduce flicker over a dimming range of the LED system by reducing driver output ripple current. The dimmable driver circuit can be configured to reduce flicker over the entire dimming range of the LED system or a subset of the dimming range, such as the lower 10% of the dimming range, the lower 20% of the dimming range, the lower 30% of the dimming range, the lower 40% of the dimming range, the lower 50% of the dimming range, or other suitable subset of the dimming range.

The dimmable driver circuit can receive a dimming control signal (e.g. a 0V to 10V dimming control signal) over an isolated dimming interface to reduce leakage current at the dimming interface. In addition, a dual-switch flyback converter circuit can be employed to increase efficiency of the driver circuit as well as to reduce electromagnetic interference (EMI) with the LED devices, such as EMI resulting from differential mode noise.

Figure 1:
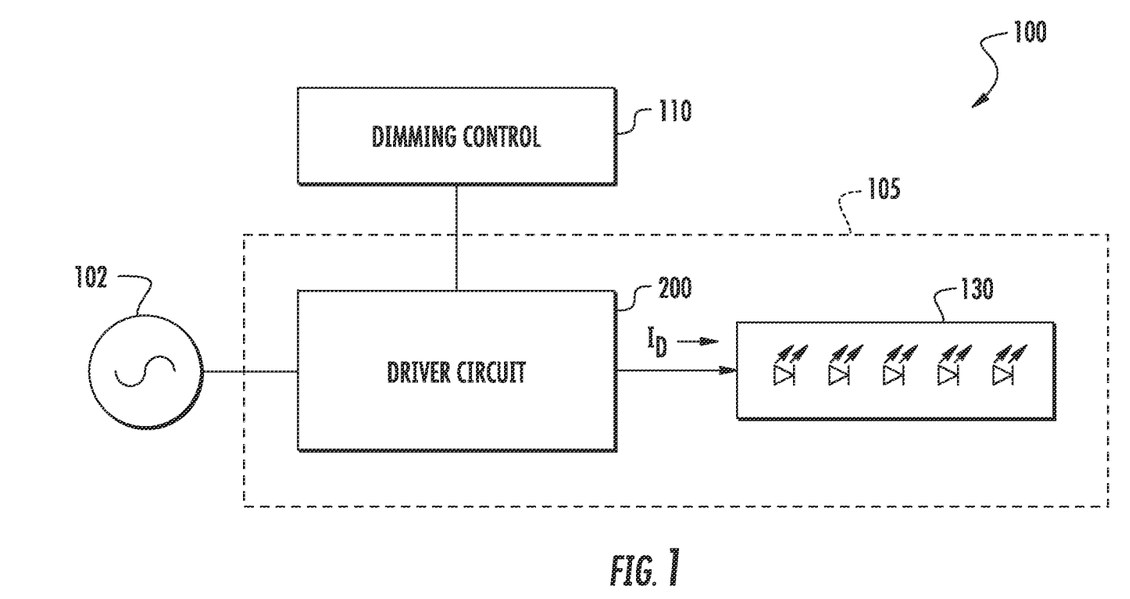
FIG. 1 depicts a block diagram of an example lighting system according to example embodiments of the present disclosure.

FIG. 1 depicts an overview of an example LED lighting system 100 according to example embodiments of the present disclosure. The LED lighting system 100 can include an LED unit 105 having a driver circuit 200 for powering one or more LED devices 130. The LED unit 105 can be a light fixture, luminaire, light engine, or other lighting unit including one or more LED devices. Although a single LED unit 105 is depicted in FIG. 1, those of ordinary skill in the art, using the disclosures provided herein will understand that the lighting system 100 can include multiple LED units without deviating from the scope of the present disclosure.

The one or more LED devices 130 can be configured to emit light as a result of electrons moving through a semiconductor material. The LED device(s) 130 can be associated with a variety of different colors, different color temperatures, different brightness, different intensities, different lighting directions and/or other characteristics. The LED device(s) 130 can be configured to emit electromagnetic energy at a variety of ranges of wavelengths including across both visible and non-visible portions of the electromagnetic spectrum. As used herein, an LED device configured to emit light refers to an LED device configured to emit visible light, ultraviolet light, infrared light, and other light or electromagnetic energy in the electromagnetic spectrum.

The LED unit 105 can include a dimmable LED driver circuit 200 configured to receive power (e.g. AC or DC power) from a power source 102. The driver circuit 200 and the one or more LED devices 130 can be implemented on one or more printed circuit boards. For instance, the driver circuit 200 can be implemented on the same or a different circuit board as one or more of the LED devices 130.

The power source 120 can be an AC power source, such a 120V, 277V, 240V, 208V or other suitable AC power source. The power source 120 can also be a DC power source, such as an energy storage device (e.g. one or more batteries). The driver circuit 200 can be configured to convert the power received from the power source 102 into a suitable driver output for driving one or more LED devices 130. For instance, the driver circuit 200 can convert the input power to a suitable regulated driver current $I_D$ for powering LED devices 130. The regulated driver current $I_D$ can be a DC current that is maintained generally constant by the driver circuit 200 to power the one or more LED devices 130.

As will be discussed in more detail below, the driver circuit 200 can include various components, such as a plurality of switching elements (e.g. transistors) and one or more controllers that are used to generate a suitable driver output. The controller(s) can control the switching elements (e.g. by providing gate timing commands to transistors) to control operation of the driver circuit 200 based on various feedback signals, such as analog feedback signals. According to example aspects of the present disclosure, the controller(s) can control various aspects of the driver circuit to provide a desired driver output at a particular power factor with reduced ripple current. The reduction of low frequency (e.g. 200 HZ or less) ripple current in the driver output can reduce flicker in the one or more LED devices 130.

As shown in FIG. 1, the driver circuit 200 can be dimmable driver circuit. The dimmable driver circuit 200 can receive a dimming control signal from dimming control 110 to control the driver current. The dimming control signal can be an analog control signal, such as a 0V to 10V lighting control signal. As used herein, 0V to 10V lighting control signal can vary from, for instance, 1V to 9V, 1V to 10V, 2V to 8V, 2V to 9V, 2V, to 10V, 1V to 11V, or other suitable range between about 0V and about 10V. Other suitable protocols can be used for the dimming control signal. For instance, the dimming control signal can be a digital addressable lighting interface (DALI) lighting control signal, digital multiplex (DMX) lighting control signal, or other control signal. The lighting control signal can be communicated to the dimmable driver circuit 200 in any suitable manner, such as over a wired or wireless interface (e.g. via an RF module).

The dimming control 110 can be external or internal to the LED unit 105. The dimming control 110 can include one or more external circuits, such as external dimming circuits. For instance, the dimming control can include one or more devices, such as a smart dimming interface, a potentiometer, a Zener diode, or other device. In particular embodiments, the dimming control 110 can include one or more manually adjustable elements (e.g. slider, knob, switch, etc.) to adjust the dimming control signal. In addition, the dimming control 110 can include one or more sensors (e.g. an optical sensor, thermal sensor, or other sensor) configured to provide feedback to the driver circuit 200 for use by the driver circuit 200 to adjust the driver output.

Figure 2:
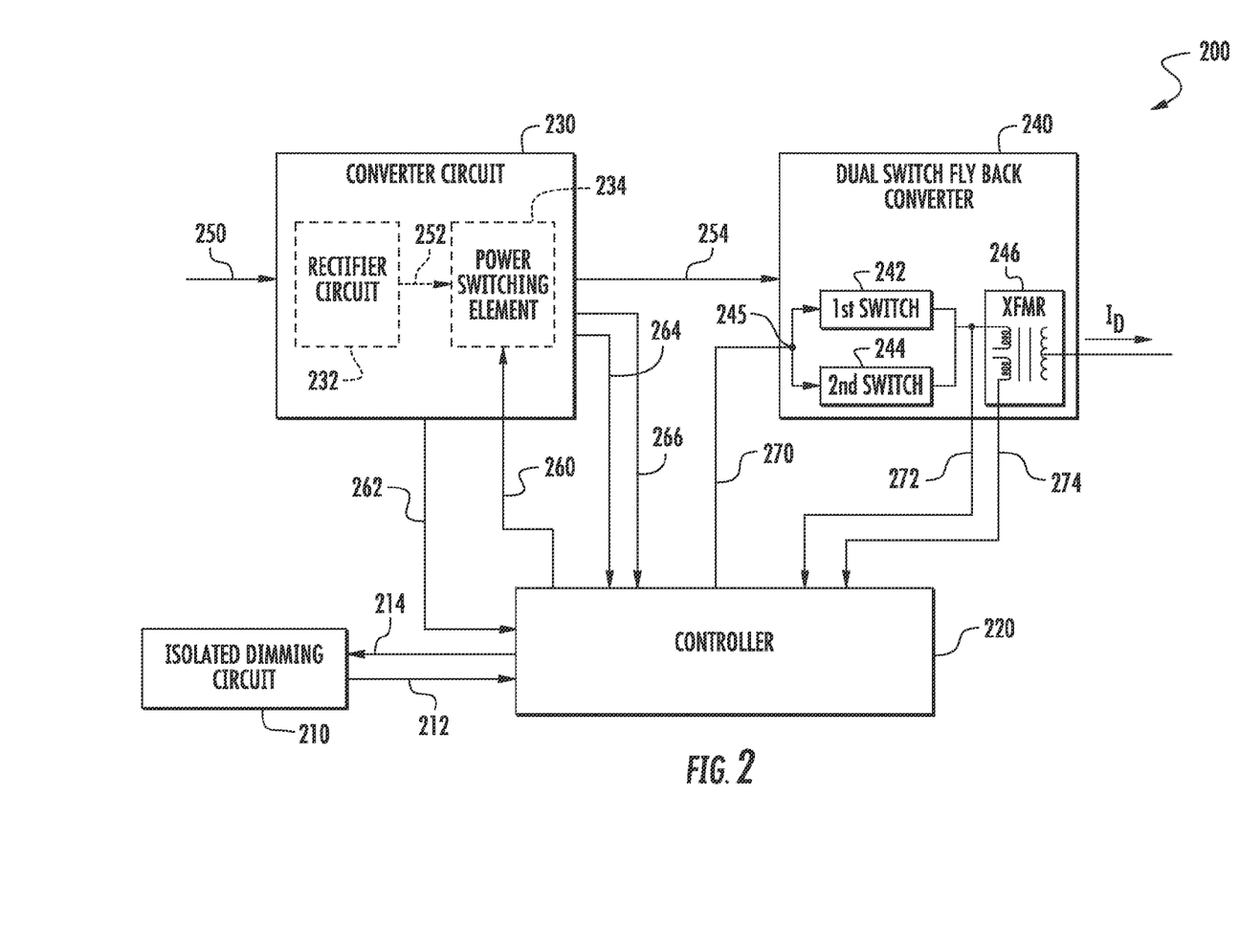
FIG. 2 depicts a schematic diagram of an example driver circuit according to example embodiments of the present disclosure.

FIG. 2 depicts a schematic diagram of one example embodiment of a driver circuit 200 according to example embodiments of the present disclosure. The driver circuit 200 is a two-stage driver circuit including a converter circuit 230 and a dual-switch flyback converter circuit 240. A controller 220 is used to control operation of the converter circuit 230 and the dual-switch flyback converter 240 to provide a desired driver current $I_D$.

More particularly, the converter circuit 230 can be configured to receive an input power 250 (e.g. input AC or DC power) and to convert the input power to an adjusted power signal 254. The adjusted power signal 254 can be a DC power signal that is provided to the dual-switch flyback converter circuit 240. The dual-switch flyback converter circuit 240 can be configured to convert the adjusted power signal 254 into a regulated driver current $I_D$.

The converter circuit 230 can include a rectifier circuit 232 and one or more power switching elements 234. The rectifier circuit 232 can be used to convert an AC input power 250 into a rectified AC input power signal 252. The rectifier circuit can include one or more circuit elements, such as diodes (e.g. a diode bridge), filters, and other circuit elements to convert the input AC power 250 to a rectified AC input power signal 252. In circumstances where the input power 250 is a DC power signal, a rectifier circuit may not be necessary to convert an AC input power to a rectified AC input power signal 252. In these embodiments, the input power signal 252 can be the DC power signal received from a DC power source.

The input power signal 252 can be converted to the adjusted power signal 254 by operation of the power switching element 234. For instance, the power switching 234 can be operated as a chopper in accordance with timing commands provided by the controller 220 to boost the input power signal to the adjusted power signal 254. In this manner, the converter circuit 230 can be operated as a boost converter. Those of ordinary skill in the art, using the disclosures provided herein, will understand that the converter circuit 230 can also be operated as a buck converter or a buck/boost converter without deviating from the scope of the present disclosure.

The power switching element 234 can be any suitable switching device that can be controlled (e.g. using PWM techniques) to adjust the input power signal 252 to the adjusted power signal 254. For instance, the power switching element 234 can be one or more transistors. In particular implementations, the power switching element 234 can be a bipolar junction transistor, such as an insulated gate bipolar junction transistor. In this particular embodiment, the power switching element 234 can be controlled using a converter drive signal 260 provided by the controller 220 to the bipolar junction transistor.

As demonstrated in FIG. 2, the adjusted power signal 254 can be provided to the dual-switch flyback converter circuit 240. The dual-switch flyback converter circuit 240 can be configured to convert the adjusted power signal 254 received from the converter circuit 234 into a regulated driver output current $I_D$. The dual-switch flyback converter circuit 242 can include two switching elements, including a first switching element 242 and a second switching element 244. The dual-switch flyback converter circuit can further include one or more diodes and one or more transformers (e.g. transformer 246). The switching elements 242 and 244 can be any suitable switching elements that can be controlled (e.g. using PWM techniques) to convert the adjusted power signal to regulated driver current $I_D$. The first switching element 242 and the second switching element 244 can be, for instance, transistors, such as MOSFET transistors.

The controller 220 can be configured to control operation of the dual-switch flyback converter circuit 242 using a flyback drive signal 270. The flyback drive signal 270 can be split at node 245 into a first drive signal for the first switching element 242 and a second drive signal for the second switching element 244 such that the first switching element 242 and the second switching element 244 are operated synchronously (e.g. switched at the same time) with one another. In particular embodiments, the node 245 can include a transformer configured to split the flyback drive signal 270 received from the controller 220 into a first drive signal for the first switching element 242 and a second drive signal for the second switching element 244.

The dual-switch flyback converter circuit 242 can also include a transformer 246. In some embodiments, the transformer 246 can includes a primary and a secondary. The primary can include a primary winding and an auxiliary winding. The secondary can include a secondary winding. The regulated driver current $I_D$ can be provided via the secondary winding. The output of the first switching element 242 and the second switching element 244 can be provided to the primary winding. The auxiliary winding can be used to provide feedback signals to the controller 220 to control operation of the dual-switch flyback converter circuit 242 as will be discussed in more detail below.

Use of a dual-switch flyback converter circuit 240 can provide various advantages over single-switch flyback converter circuits. For example, the dual switch flyback converter circuit 240 can improve the efficiency of the driver circuit 200 by eliminating the need for a snubber circuit that is typically required in flyback converter circuits. Accordingly, a dual-switch flyback converter circuit 240 does not require the dissipation of energy in a snubber circuit, leading to energy conservation and efficiency improvement. This can be particularly beneficial in higher power applications.

In addition, single-switch flyback converter circuits can lead to differential mode noise from the output transformer of the flyback converter circuit. The use of dual switches in a dual-switch flyback converter circuit reduces the differential mode noise at the output transformer. Accordingly, the dual-switch flyback converter produces less electromagnetic interference (EMI). This can be particularly useful in LED driver circuits as LED devices can be more susceptible flicker resulting from EMI.

According to particular aspects of the present disclosure, the driver circuit 200 includes means for reducing the ripple current of the output driver current so as to reduce flicker in LED devices powered by the driver circuit 200. The means for reducing the ripple current can include the controller 220. The controller 220 can include one or more control devices, such as one or more microcontrollers, microprocessors, logic devices, integrated circuits, or other control devices. In a particular implementation, the controller 220 can be the iW3630 power controller available from Dialog Semiconductor. The controller 220 can be configured to operate the converter circuit 230 and the dual-switch flyback converter circuit 240 based on various analog input signals to provide improved performance of the driver circuit 220, such as to achieve power factor correction, flicker reduction, reduced EMI, and other advantages.

More particularly, the driver circuit 200 can include an isolated dimming circuit 210. The isolated dimming circuit 210 can be configured to receive a lighting control signal (e.g. a 0V to 10V lighting control signal) and convert the signal to a suitable analog signal 212 for use by the controller 220 in generating the regulated driver current $I_D$. In particular embodiments, the isolated dimming interface 210 can include an isolating transformer. Because the lighting control signal (e.g. 0V to 10V lighting control signal) can be a DC signal, the controller 220 can provide a transformer drive signal 214 to the isolation transformer. The transformer drive signal 214 can provide an alternating current signal to the isolation transformer (e.g. a square wave) to allow signals to pass through the isolation transformer. The isolation transformer can provide a suitable dimming signal 212 to the controller 220 based on the lighting control signal input to the dimming circuit 210. In this way, the driver circuit 210 can reduce undesirable leakage currents at the dimming circuit 210 to improve performance of an LED lighting system.

The controller 220 can be configured to control the converter circuit 230 and the dual-switch flyback converter circuit 240 to generate the regulated driver current $I_D$ based at least in part on the dimming signal 212. For instance, the controller 220 can provide a converter drive signal 260 to the power switching element 234 of the converter circuit to convert the AC rectified input signal 252 to an adjusted power signal 254. The controller 220 can also provide a flyback drive command 270 determined based at least in part on the dimming signal 212 to control first switching element 242 and second switching element 244 of the dual-switch flyback converter circuit 240 to generate the regulated driver current $I_D$.

More particularly, the controller 220 can be configured to control the converter circuit 230 to convert a rectified AC input signal 252 into an adjusted power signal by providing a converter drive signal 260 to the power switching element 234 to chop the rectified AC input signal. Chopping the rectified AC rectified input signal 252 with the power switching element 234 can convert the AC rectified input signal 252 to another voltage and can remove low frequency components from the AC rectified input signal 252 to generated the adjusted power signal 254. As used herein, low frequency components can be AC components associated with a frequency of 200 Hz or less, such as 160 Hz or less, such as 100 Hz or less, such as 70 Hz or less. In this way, use of the adjusted power signal 254 for conversion by the dual-switch flyback transistor circuit 240 can reduce low frequency ripple current in the regulated driver current $I_D$, resulting in reduced flicker in LED devices powered by the driver circuit 200.

According to particular aspects of the present disclosure, the controller 220 can generate the converter drive signal 260 based on various analog signals. For instance, the controller 220 can receive a converter voltage sense feedback signal 262, a converter current sense feedback signal 264, and/or a converter output voltage signal 266. The converter output voltage signal 266 can be indicative of the voltage of the adjusted power signal 254. The converter output voltage signal 266 can be used, for instance, as feedback for the controller 220 to reduce error between the actual voltage of the adjusted power signal 254 and a desired voltage of the adjusted power signal 254.

The converter voltage sense feedback signal 262 and the converter current sense feedback signal 264 can be used by the controller 220 to generate the converter drive signal 260 for power factor correction. For instance, the controller 220 can generate the converter drive signal 260 to ensure that the voltage of the AC rectified input signal 252 and the current flowing through the converter are closely in phase to achieve a high power factor (e.g. greater than 0.90) for the driver circuit 200. Various switching techniques can be used to keep the AC rectified input signal 252 and the current flowing through the converter closely in phase For instance, the switching off of the power switching element 234 can be timed based on the converter current sense feedback signal 264 to achieve a desired power factor.

The controller 220 can control the dual-switch flyback converter circuit 240 based at least in part on the dimming signal 212 received from the dimming circuit 210 to provide a desired regulated driver current output $I_D$ corresponding to the dimming level indicated by the dimming signal 212. More particularly, control logic implemented by the controller 220 can determine a desired driver output based at least in part on the dimming signal 212. The controller 220 can provide a flyback drive command 270 to the dual switch flyback converter circuit 240 to convert the adjusted power signal 254 to the desired driver output.

Feedback signals on the primary side of the transformer 246 of the dual-switch flyback converter circuit 240 can be used by the controller 220 to generate the flyback drive command 270 in order to regulate the driver current $I_D$ output by the driver circuit 200. For instance, a flyback voltage sense signal 274 can be indicative of the voltage of the primary-side of the transformer 246 of the dual-switch flyback converter circuit 240. The controller 220 can use the flyback voltage sense signal 274 as feedback for generating the flyback driver signal 270 for maintaining the voltage of the primary-side of the transfer 246 to a desired level (e.g. as determined based at least in part on the dimming signal 212).

A flyback current sense signal 272 can be indicative of a current flowing on the primary-side of the dual-switch flyback converter circuit 240. The flyback current sense signal 272 can be used by the controller 220 for a variety of purposes. For instance, the flyback current sense signal 272 can be used by the controller 220 to implement overcurrent protection.

Figure 3:
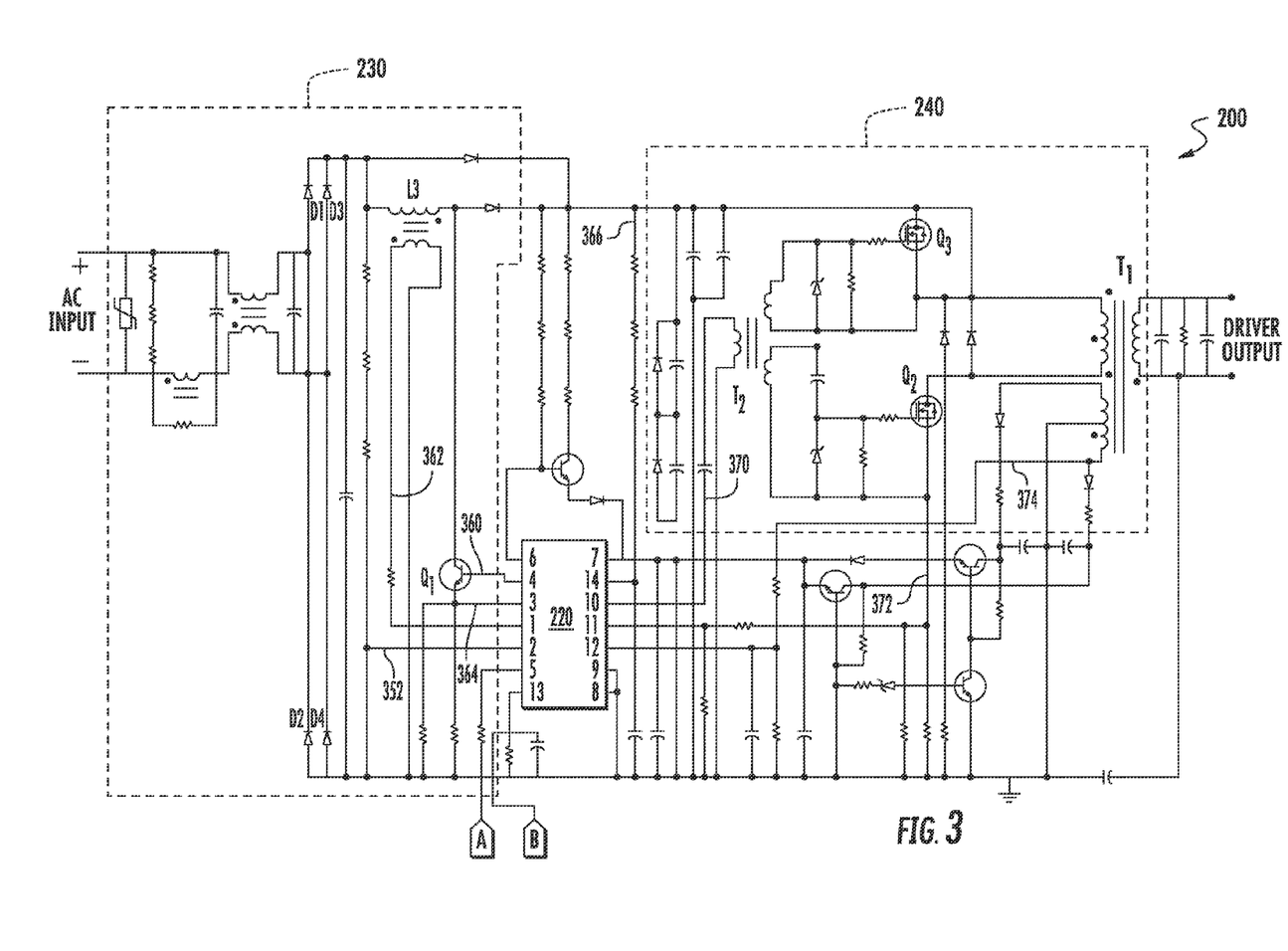
FIG. 3 depicts a circuit diagram of an example driver circuit according to example embodiments of the present disclosure.
Figure 4:
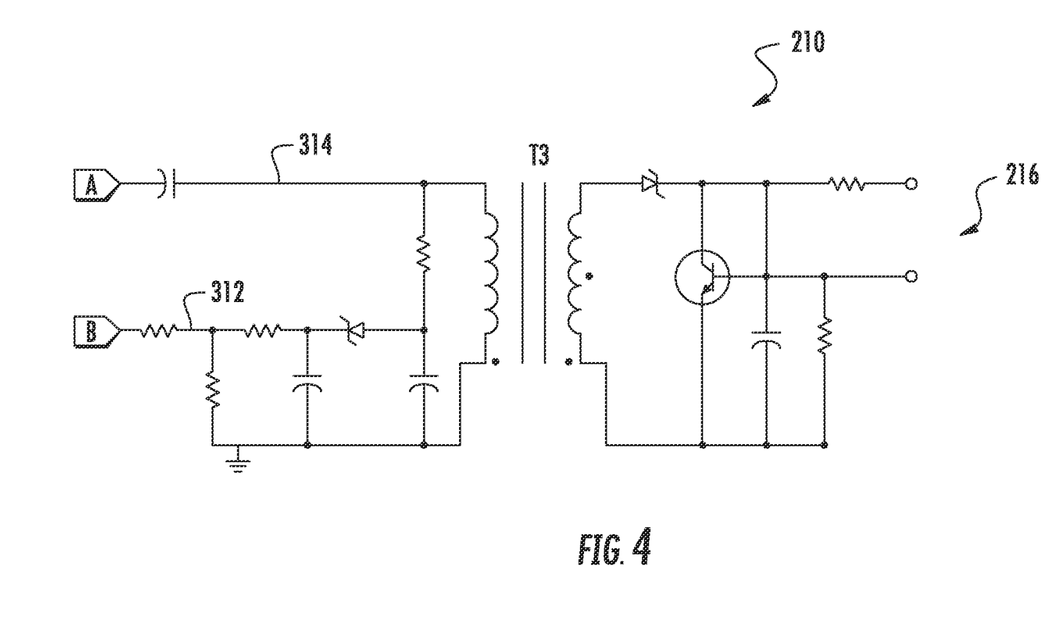
FIG. 4 depicts a circuit diagram of an example isolated dimming circuit according to example embodiments of the present disclosure.

FIGS. 3 and 4 depict circuit diagrams of an example implementation of the driver circuit 200 according to example embodiments of the present disclosure. FIG. 3 depicts various circuit components of the converter circuit 230, the dual-switch flyback converter circuit 240, and the controller 220. FIG. 4 depicts an example isolated dimming circuit 210 used to provide dimming signals to the controller 220.

The controller 220 of FIG. 3 can be an iW3630 controller available from Dialogue Semiconductor. The controller 220 can include 14-pins to receive various analog input signals and provide various output signals to the dimming circuit 210, the converter circuit 230 and the dual-switch flyback converter circuit 240. For instance, pin 1 can be configured to receive the converter voltage sense feedback signal 262 (shown in FIG. 2). Pin 2 can be configured to receive a signal indicative of the AC rectified input signal 252. Pin 3 can be configured to receive the converter current sense feedback signal 264. Pin 4 can be configured to provide the converter drive output 260. Pin 5 can be configured to provide the transformer drive signal 214. Pin 6 can be configured to provide an active start up output for implementing startup logic by the controller 220. Pin 7 can provide power to the controller 220. Pin 8 can provide power ground for the controller 220. Pin 9 can provide signal ground for the controller. Signal ground can be coupled to power ground, for instance, on a printed circuit board. Pin 10 can provide the flyback drive output 270. Pin 11 can receive the flyback current sense signal 272. Pin 12 can receive the flyback voltage sense signal 274. Pin 13 can receive the dimming signal 212 from the dimming circuit 210. Pin 14 can receive the converter output voltage signal 266.

As shown in FIG. 3, converter circuit 230 can receive an AC input and provide the AC input to a diode bridge (D1, D2, D3, and D4) to rectify the AC input to the AC rectified input power signal. As shown, a signal indicative of the AC rectified input signal can be communicated to pin 2 of the controller over signal path 352. Sense inductor L3 can be used to sense the converter voltage sense feedback signal and communicate the converter voltage sense feedback signal to pin 1 of the controller 220 over signal path 362. The converter current sense feedback signal can be communicated to pin 1 of the controller 220 over signal path 364. The converter output voltage signal can be communicated to pin 14 of the controller over signal path 366.

As further shown in FIG. 3, converter circuit 230 includes a bipolar junction transistor Q1 that is used as the power switching element to chop the AC rectified input signal to generate the adjusted power signal for the dual-switch flyback converter circuit 240. As shown, the controller 220 can be configured to provide the converter drive output from pin 4 to the bipolar junction transistor Q1 via signal path 360 to control the switching of the bipolar junction transistor Q1.

As discussed above, the controller 220 controls the bipolar junction transistor Q1 based on the AC input signal, the converter voltage sense feedback signal, the converter current sense feedback signal, and the converter output voltage signal. In embodiments, the controller 220 can control the bipolar junction transistor Q1 to boost the voltage of the AC rectified input signal and to remove low frequency AC components of the AC rectified input signal to generate the adjusted power signal for the dual-switch flyback converter circuit 240. The bipolar junction transistor Q1 can also be controlled such that the AC rectified input signal and the converter current are closely in phase to provide increased power factor (e.g. greater than 0.90) for the driver circuit 200.

The adjusted power signal generated by the converter circuit 230 is provided to the dual-switch flyback converter circuit 240. The dual-switch flyback converter circuit includes an input transformer T2, an output transformer T1, a first switching element Q2, and a second switching element Q3. The first switching element Q2 and the second switching element Q3 can be MOSFET devices.

The input transformer T2 is configured to receive the flyback drive signal from pin 11 of the controller 220 over signal path 370. The flyback drive signal is received at the primary of transformer T2. The transformer T2 has two secondary windings. The first secondary winding is in communication with the first switching element Q2. The second secondary winding is in communication with the second switching element Q3. In this manner, the transformer T2 can split the flyback drive signal communicated from pin 11 of the controller 220 into a first drive signal for the first switching element Q2 and a second drive signal for the second switching element Q3.

The dual switch flyback converter circuit includes an output transformer T1. The output transformer T1 includes a primary and a secondary. The primary has a primary winding and an auxiliary winding. The secondary has a secondary winding configured to provide the driver output. The output of the first switching element Q2 and the second switching element Q3 is provided to the primary winding. The auxiliary winding is used to provide feedback signals to the controller 220 for use in generating the flyback drive signal for controlling the first switching element Q2 and the second switching element Q3.

More particularly, the controller 220 can be configured to generate the flyback drive signal based at least in part on a flyback voltage feedback signal and a flyback current feedback signal. The flyback current feedback signal can be communicated from the flyback converter circuit 240 to pin 11 of the controller 220 over signal path 372. The flyback voltage feedback signal can be communicated from the auxiliary winding of the output transformer T1 over signal path 374.

The controller 220 can be further configured to generate the flyback drive signal for controlling the first switching element Q2 and the second switching element Q3 of the flyback converter circuit 240 based on a dimming signal received from the dimming circuit 210. FIG. 4 depicts an example dimming circuit 210 configured to provide a dimming signal to the controller 220. The dimming circuit 210 shown in FIG. 4 can be configured to convert a dimming control signal (e.g. a 0V to 10V lighting control signal) received at interface 216 into the dimming signal for the controller 220. The dimming signal can be communicated to the pin 13 of the controller 220 via signal path 312.

As shown in FIG. 4, the dimming circuit 210 includes an isolating transformer T3. The isolating transformer T3 can reduce leakage current across the dimming circuit 210. Because the dimming circuit 210 can receive a DC lighting control signal (e.g. a 0V to 10V lighting control signal), a transformer drive signal can be communicated from pin 5 the controller 220 to the transformer T3 over signal path 314. The transformer drive signal can provide an AC signal to the transformer T3 to allow communication across the transformer T3. The transformer drive signal can be, for instance, a square wave drive signal.

Referring back to FIG. 3, the bipolar junction transistor Q1 of the converter circuit 230 can generate significant heat during operation. The driver circuit can include means for dissipating heat associated with the bipolar junction transistor Q1 (the power switching element). For example, a heat sink can be placed in thermal communication with the bipolar junction transistor Q1. According to example embodiments of the present disclosure, an L-shaped heat sink can be used to dissipate the heat from the bipolar junction transistor Q1.

Figure 5:
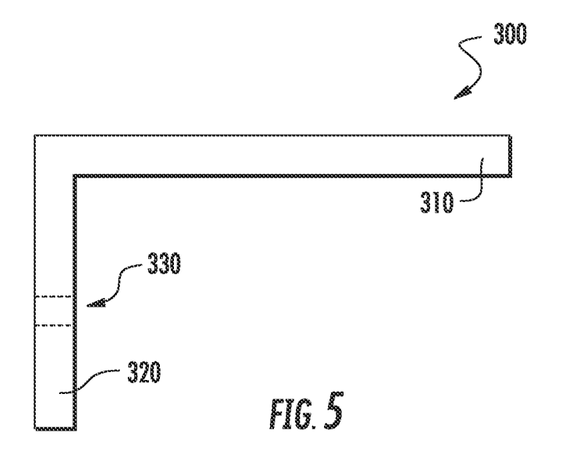
FIG. 5 depicts an example heat sink to be used in conjunction with a driver circuit according to example embodiments of the present disclosure.
Figure 6:
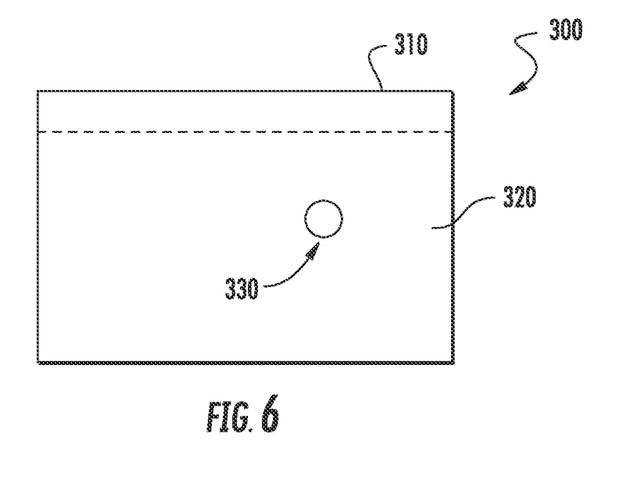
FIG. 6 depicts an example heat sink to be used in conjunction with a driver circuit according to example embodiments of the present disclosure.

FIGS. 5 and 6 depict an example heat sink 300 that can be used to dissipate the heat from the bipolar junction transistor Q1 according to example embodiments of the present disclosure. The heat sink 300 is an L-shaped heat sink. The heat sink includes a first leg 310 and a second leg 320. The second leg 320 can be configured to be placed in thermal communication with the bipolar junction transistor Q1. For instance, the second leg 320 can be secured to a portion of the bipolar junction transistor Q1 through aperture 330. As an example, as screw, fastener, or other securing device can be configured to secure the heat sink 300 to the bipolar junction transistor Q1 through aperture 330. The heat sink 300 can be made from any suitable thermal conducting material. In one example implementation, the heat sink is made from an aluminum alloy.

Figure 7:
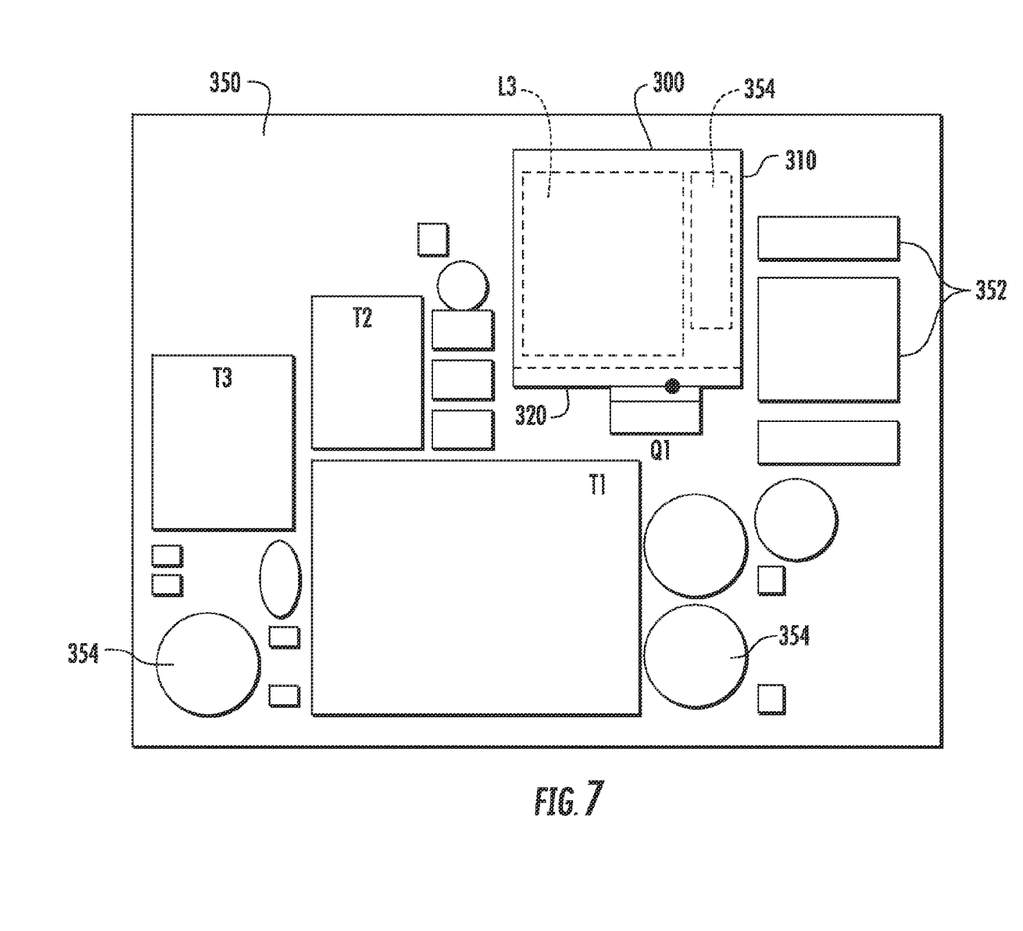
FIG. 7 depicts an example layout of a printed circuit board including the heat sink to be used in conjunction with a driver circuit according to example embodiments of the present disclosure.

The L-shaped heat sink 300 can provide a relative large heat sink for the bipolar junction transistor Q1 without occupying too great a footprint on a printed circuit board. For instance, FIG. 7 depicts an example layout of a printed circuit board 350 according to example aspects of the present disclosure. The printed circuit board 350 includes various aspects of the driver circuit 200 depicted in FIGS. 3 and 4, such as transformers T1, T2, and T3, bipolar junction transistor Q1, inductor L3, as well as various other circuit component, such as inductors 352, capacitors 354, and various other circuit components. Other components of the driver circuit 200 (e.g. controller 220, diodes D1, D2, D3, D4) can be located on the other side of the printed circuit board 350.

As shown in FIG. 7, the L-shaped heat sink 300 can be disposed such that the first leg 310 of the heat sink 300 overhangs other components on the printed circuit board 350, (e.g. inductor L3 and capacitor 354). The foot print occupied by the heat sink 300 is the portion of the second leg 320 that contacts the printed circuit board 350 where the second leg 320 is secured to the bipolar junction transistor Q1. In this way, the heat sink 300 can provide for cooling of the bipolar junction transistor Q1 without occupying too much space on the printed circuit board 350.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A driver circuit for providing a driver output to one or more light emitting diode (LED) devices, the driver circuit comprising:
   an input configured to receive an input power signal;
   a converter circuit configured to adjust the input power signal to an adjusted power signal;
   a dual-switch flyback converter circuit, the dual-switch flyback converter circuit comprising a first switching element and a second switching element, the dual-switch flyback converter circuit configured to convert the adjusted power signal to a driver output; and
   a controller configured to generate a flyback drive signal for switching the first switching element and the second switching element of the dual-switch flyback converter circuit, the controller configured to control the converter circuit to reduce low frequency AC components in the adjusted power signal so that low frequency ripple in the driver output is reduced;
   wherein the dual-switch flyback converter circuit comprises an output transformer, the controller configured to generate the flyback drive signal based at least in part on a flyback voltage sense signal received from the output transformer.

2. The driver circuit of claim 1, wherein the driver circuit comprises a dimming circuit configured to receive a dimming control signal, the controller configured to generate the flyback drive signal based at least in part on the dimming control signal.

3. The driver circuit of claim 2, wherein the dimming circuit comprises an isolating transformer.

4. The driver circuit of claim 2, wherein the dimming control signal is a 0V to 10V dimming control signal.

5. The driver circuit of claim 1, wherein the converter circuit comprises a power switching element, the controller configured to generate a converter drive signal to control the power switching element to convert the input power signal to the adjusted power signal.

6. The driver circuit of claim 5, wherein the converter circuit comprises a rectifier circuit, the rectifier signal configured to provide the input power signal as an AC rectified input signal.

7. The driver circuit of claim 1, wherein the controller is configured to control the power switching element based on at least one of a converter current feedback signal or a converter voltage feedback signal.

8. The driver circuit of claim 1, wherein the driver circuit comprises an L-shaped heat sink in thermal communication with the power switching element.

9. The driver circuit of claim 1, wherein the dual-switch flyback converter circuit comprises an input transformer configured to split the flyback drive signal into a first drive signal for driving the first switching element and a second drive signal for driving the second switching element.

10. The driver circuit of claim 1, wherein the controller is configured to generate the flyback drive signal based at least in part on a flyback current feedback signal received from the output transformer.

11. A light emitting diode (LED) lighting system, comprising:
    one or more LED devices;
    a converter circuit comprising a rectifier and a power switching element, the rectifier configured to convert an AC input power into an AC rectified input signal, the converter circuit configured to convert the AC rectified input signal to an adjusted power signal;
    a dual-switch flyback converter circuit configured to receive the adjusted power signal and to convert the adjusted power signal to a driver output, the dual-switch flyback converter comprising an input transformer, an output transformer, a first switching element and a second switching element;
    a dimming circuit configured to receive a dimming control signal; and
    a controller configured to generate a flyback drive signal for switching the first switching element and the second switching element of the dual-switch flyback converter circuit based at least in part on the dimming signal;
    wherein the controller is configured to control the power switching element to reduce low frequency AC components in the adjusted power signal, the controller further configured to generate the flyback drive signal based at least in part on a flyback voltage sense signal and a flyback current sense signal associated with the output transformer.

12. The LED system of claim 11, wherein the dimming circuit comprises an isolating transformer.

13. The LED system of claim 11, wherein the dimming control signal is a 0V to 10V dimming control signal.

14. The LED system of claim 11, wherein the power switching element is a bipolar junction transistor.

15. The LED system of claim 14, further comprising an L-shaped heat sink in communication with the bipolar junction transistor.

16. The LED system of claim 11, wherein the controller is configured to control the power switching element based on at least one of a converter current sense feedback signal or a converter voltage sense feedback signal.

17. A light emitting diode (LED) unit, the LED unit comprising:
- one or more LED devices,
- a converter circuit comprising a power switching element, the converter circuit configured to convert an input power signal to an adjusted power signal;
- a dual-switch flyback converter circuit configured to receive the adjusted power signal and to convert the adjusted power signal to a driver output, the dual-switch flyback converter comprising a first switching element and a second switching element; and
- means for reducing a ripple current of the driver output so as to reduce flicker in the one or more LED devices;
- wherein the means comprises a controller configured to generate a flyback drive signal based at least in part on a flyback voltage feedback signal associated with an auxiliary winding of an output transformer of the dual-switch flyback converter circuit.

18. The LED unit of claim 17, wherein LED unit further comprises means for dissipating heat generated by the power switching element.

* * * * *